United States Patent
Wohlert et al.

(10) Patent No.: US 9,230,285 B2
(45) Date of Patent: Jan. 5, 2016

(54) METHOD AND APPARATUS FOR PROVIDING A SOCIAL EVENT OPPORTUNITY NOTIFICATION

(75) Inventors: Randolph Wohlert, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 13/308,692

(22) Filed: Dec. 1, 2011

(65) Prior Publication Data

US 2013/0144944 A1     Jun. 6, 2013

(51) Int. Cl.
*H04L 29/06* (2006.01)
*G06Q 50/00* (2012.01)
*H04L 29/08* (2006.01)

(52) U.S. Cl.
CPC ............. *G06Q 50/01* (2013.01); *H04L 29/06* (2013.01); *H04L 67/14* (2013.01); *H04L 69/329* (2013.01)

(58) Field of Classification Search
CPC ..... G06Q 10/10; G06Q 50/01; G06Q 10/109; H04L 29/06; H04L 67/325; H04L 67/14; H04L 65/4038; H04L 29/06027; H04L 69/329
USPC .................................................. 709/204–207
See application file for complete search history.

(56) References Cited

U.S. PATENT DOCUMENTS

| | | | |
|---|---|---|---|
| 2002/0128894 A1* | 9/2002 | Farenden | 705/8 |
| 2008/0098087 A1* | 4/2008 | Lubeck | 709/218 |
| 2009/0265428 A1* | 10/2009 | Light et al. | 709/204 |
| 2009/0307234 A1* | 12/2009 | Zrike et al. | 707/10 |
| 2009/0319607 A1* | 12/2009 | Belz et al. | 709/204 |
| 2010/0082821 A1* | 4/2010 | Rosenblatt et al. | 709/228 |
| 2010/0105413 A1* | 4/2010 | Boyd | 455/456.1 |
| 2010/0281113 A1* | 11/2010 | Laine et al. | 709/204 |
| 2011/0125844 A1* | 5/2011 | Collier et al. | 709/204 |
| 2011/0178837 A1* | 7/2011 | Goerges et al. | 705/7.28 |
| 2011/0196771 A1* | 8/2011 | Lacerte et al. | 705/35 |
| 2011/0202455 A1* | 8/2011 | Vasten et al. | 705/39 |
| 2013/0046823 A1* | 2/2013 | Mitchell et al. | 709/204 |

* cited by examiner

*Primary Examiner* — Peter Shaw
*Assistant Examiner* — Don Zhao

(57) ABSTRACT

Methods and apparatus for arranging event opportunities are disclosed. For example, the method detects the event opportunity that matches user profiles of at least two users who are unassociated with one another, verifies a safety parameter for one of the at least two users, wherein the safety parameter is defined by the one of the at least two users, and if the safety parameter is satisfied, sending an invitation to the event opportunity to each of the at least two users.

15 Claims, 4 Drawing Sheets

METHOD AND APPARATUS FOR PROVIDING A SOCIAL EVENT OPPORTUNITY NOTIFICATION

The present disclosure relates generally to communication networks and, more particularly, to methods, computer-readable media and devices for arranging social event opportunities.

BACKGROUND

The proliferation of online social networks has enabled users to interconnect with others of similar interest over a network, e.g., the internet. Some online social networks allow users to immediately connect with others having similar interests. For example, gaming websites allow users to immediately enter multi-player games based upon skill level and other criteria.

SUMMARY

In one embodiment, the present disclosure discloses a method for arranging an event opportunity. For example, the method detects the event opportunity that matches user profiles of at least two users who are unassociated with one another, verifies a safety parameter for one of the at least two users, wherein the safety parameter is defined by the one of the at least two users, and if the safety parameter is satisfied, sending an invitation to the event opportunity to each of the at least two users.

In another embodiment, the present disclosure discloses an additional method for arranging an event opportunity. For example, the method defines an event opportunity type that is of interest to a user, registers a safety parameter, wherein the safety parameter is defined by the user, receives a notification of the event opportunity that matches the event opportunity type that is of interest to the user, and a potential user in accordance with the safety parameter, and receives contact information for communicating with the potential user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
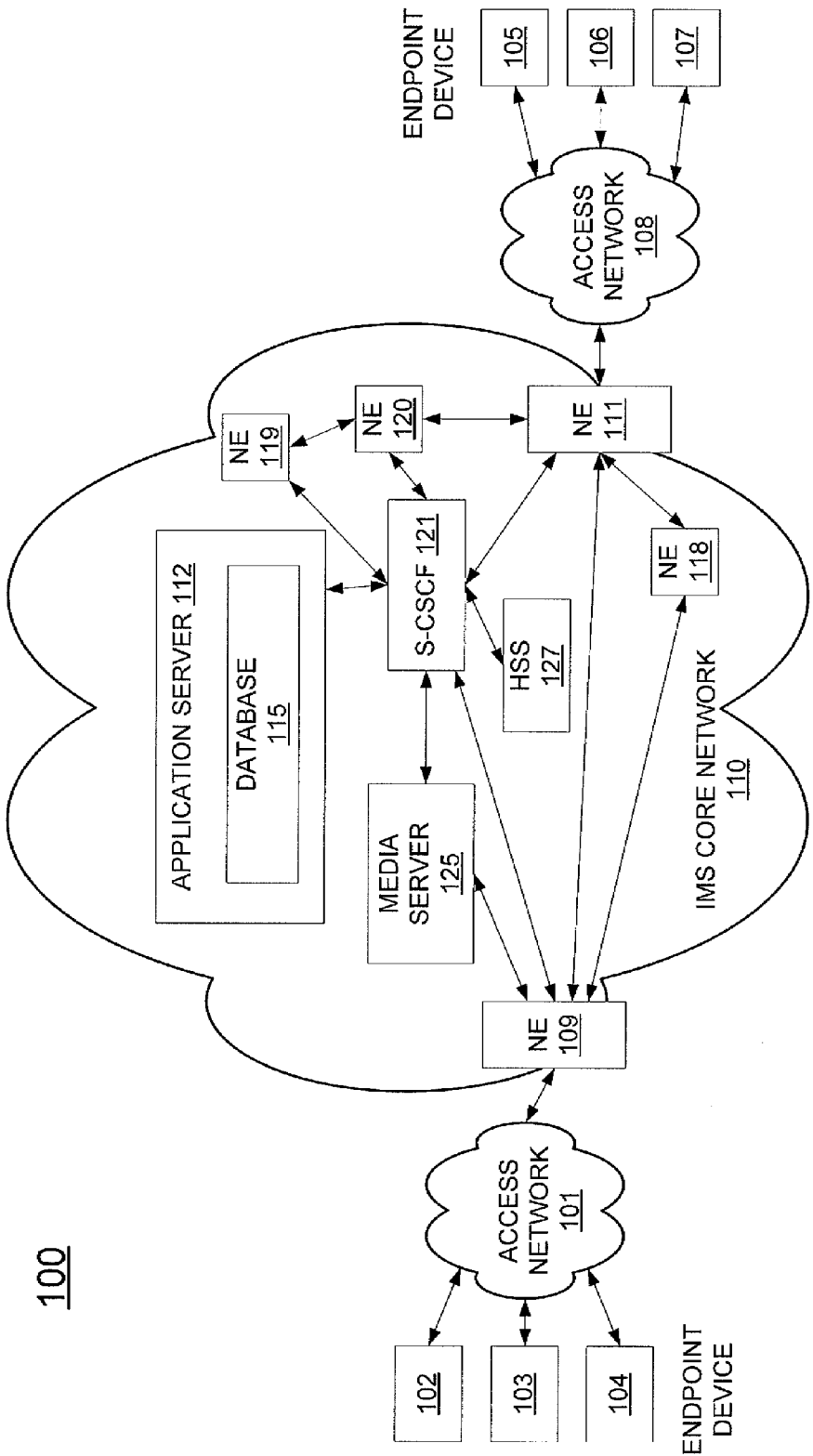
FIG. 1 illustrates an exemplary network related to the present disclosure.

The present disclosure broadly discloses methods and computer-readable media for detecting and arranging social event opportunities. Although the present disclosure may describe embodiments in the context of particular networks, systems and environments, the present disclosure is not so limited. Namely, the present disclosure can be applied to any type of computer-based communication network that is capable of supporting communications between devices.

In various embodiments, the present disclosure provides a network-based social event opportunity service that recognizes and offers social engagement opportunities to users. For instance, embodiments of the present disclosure may be deployed in, or provided by, a core network application server. In one embodiment, the service accesses and aggregates user information including, inter alia, user preferences, social information, user interests, user defined safety criteria, user availability and user location. In one embodiment, the user preferences include one or more preferred event opportunity types that are of interest to the user. In one embodiment, one or more pieces of the user information are maintained in a user profile. In one embodiment, the service obtains a user profile and/or other user information externally. For example, an application server may obtain the user profile from a home subscriber server (HSS)/home location register (HLR). Furthermore, user location information may be obtained by querying a user device, e.g., global positioning system (GPS) based location information, and other means, e.g., triangulation information based on cell site information, and the like.

In one embodiment, the service may access and aggregate event opportunity information for determining and notifying users of potentially interesting social engagement opportunities. For example, the service may match event opportunity information with potentially interested users based upon the user preferences, users interests, and the like (e.g., as maintained in the user profiles). As part of such process, the service may additionally match users with each other based upon the same criteria (i.e., the various pieces of user information).

Notably, embodiments of the present disclosure facilitate event opportunities for users who are unassociated with one another. For example, a first user and a second user may be considered unassociated with one another (e.g., strangers) if the two users are not on each others' buddy lists, telephone contact lists, email address lists, and the like. Similarly, two users may be deemed unassociated where the two users have had no prior direct contact/communications. For instance, two users who have had no prior direct telephone contact, email contact, text messaging contact, instant messaging contact, and the like are considered to have had no prior direct contact. In addition, two users may be considered unassociated where the two users are not linked with one another in one or more social networking contexts (e.g., friends through an online social networking service, linked via an online professional networking service, etc.). In short, various points of information are available (e.g., to a network provider) from which to determine that two users are unassociated with one another.

In one embodiment, a user profile may include feedback/rating information based upon past social event opportunities in which the user has participated. For example, participants in a social event opportunity may provide feedback/ratings with respect to other participants with whom they are matched. Thus, information may then be used in the future with respect to evaluating further potential social event opportunities for the rated participant. Additionally, in one embodiment, participants provide their own user-defined safety criteria, or safety parameters, which are broadly applicable over all potential social event opportunities that may arise. In particular, the various user-defined safety criteria are parameters which a particular user desires other matched participants to satisfy in order for the particular user to be willing to engage in a particular event opportunity with the other matched participants.

Embodiments of the present disclosure thus address the problem of users missing opportunities for social engagement because they are unaware of the existence of such opportunities, or because they are unaware of other interested persons who are available and who may be nearby. In addition, embodiments of the present disclosure address the problem of assuring participants that the other users with whom the participants may be matched are reliable, safe and trustworthy.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements (NEs) 109 and 111 may serve as gateway servers or edge routers for the network 110.

The endpoint devices 102-107 may comprise user endpoint devices such as personal computers, laptop computers, Personal Digital Assistants (PDAs), mobile phones, cellular phones, smart phones, computing tablets, email devices, messaging devices, and the like. For example, each of the endpoint devices may comprise a subscriber's mobile endpoint device or a vendor/third-party's endpoint device (e.g., a point-of-sale (POS) terminal or a computer), as will be described in greater detail below. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a cellular network, a Wi-Fi network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

In one embodiment, the IMS core network 110 may also comprise a Home Subscriber Server (HSS) 127, a Serving-Call Session Control Function (S-CSCF) 121, a Media Server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

In one embodiment, the Media Server (MS) 125 is a dedicated server that typically handles and terminates media streams to provide services such as announcements, bridges, and Interactive Voice Response (IVR) messages for VoIP service applications. The MS 125 also interacts with customers for media session management to accomplish tasks such as process requests.

The application server 112 may comprise any server or computer that is well known in the art, and the database 115 may be any type of electronic collection of data that is also well known in the art. In one embodiment, the application server 112 may be configured to detect and arrange social event opportunities for registered participants/users. Accordingly, in one embodiment the database 115 may store a list of participant/user profiles to support and enable the arrangement of social event opportunities between the registered users, as discussed in greater detail below.

The above IP network is only described to provide an illustrative environment in which packets for voice, data and/or multimedia services are transmitted on networks. It should be noted that the communication network 100 may be expanded by including additional endpoint devices, access networks, network elements, application servers, etc. without altering the scope of the present disclosure.

Figure 2:
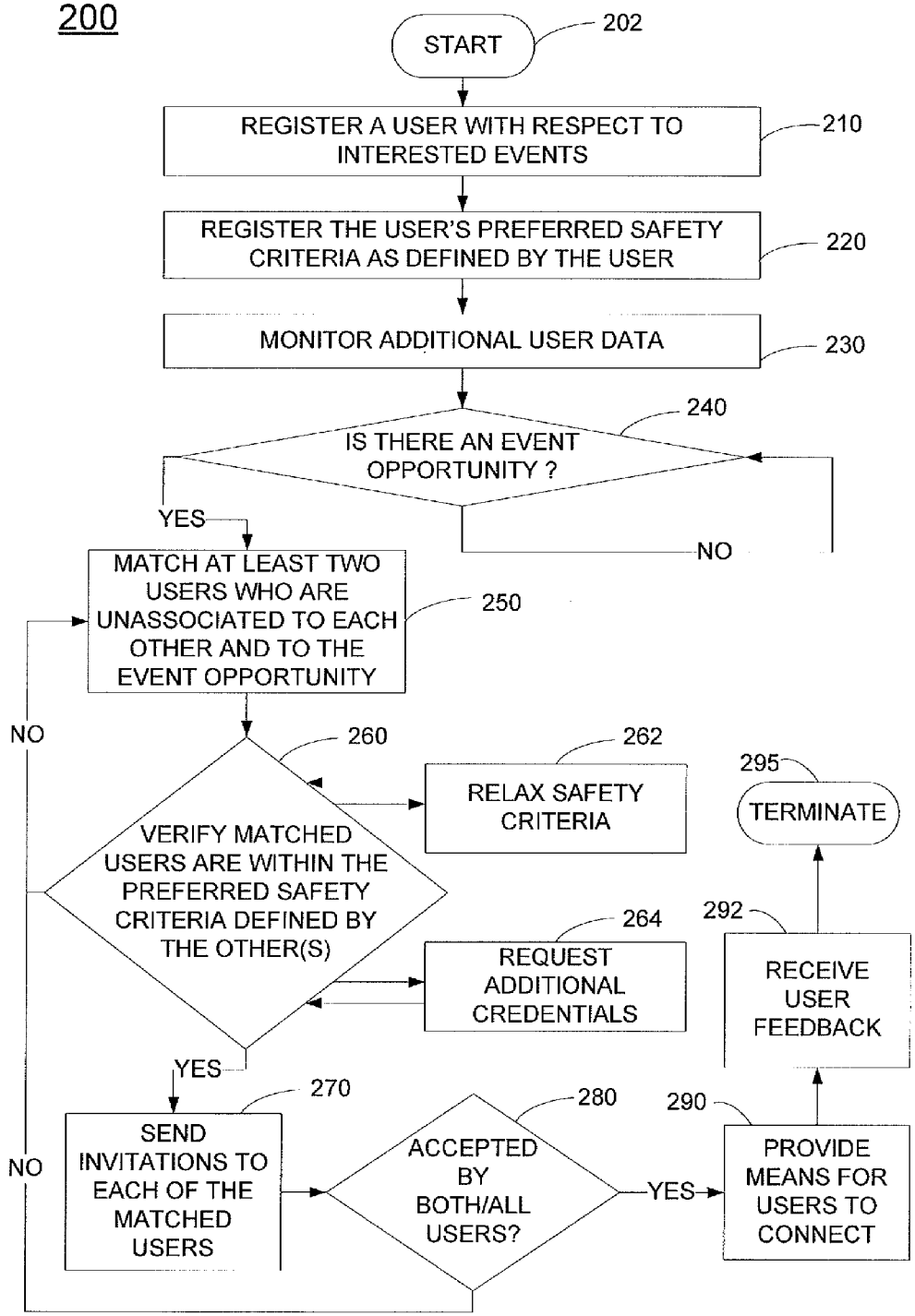
FIG. 2 illustrates a flowchart of a method for arranging social event opportunities, according to embodiments of the present disclosure.

FIG. 2 illustrates a flowchart of a method 200 for arranging a social event opportunity. In one embodiment, one or more steps of the method 200 can be performed by one or more of the components of the core network 110 and/or access networks 101 and 108, which may comprise wireless access networks. For example, in one embodiment one or more steps of the method 200 can be implemented by an application server such as AS 112. Alternatively, or in addition, one or more steps of the method 200 may be implemented by a general purpose computer having a hardware processor, a memory and input/output devices as illustrated below in FIG. 4.

The method begins in step 202 and proceeds to step 210. At step 210, the method 200 registers a user with respect to one or more event opportunity types of interest to the user. For instance, a user may agree to provide voluntary user profile information to a network provider for a social event opportunity service. Such service may comprise a value-added service to subscribers of the network provider (e.g., a telecommunications network provider). In one embodiment, the user profile information provided at step 210 is different from general user profile information maintained by the network provider. For instance, the network provider may maintain various data in a user profile, such as name, address, billing information, device number, device types, subscription and service agreement information, password information, current location information, and the like. This user profile may be maintained in a HSS/HLR or other devices in a network provided by the network provider (e.g., a network such as depicted in FIG. 1). However, in addition to such information, the user may create additional user profile information for use in connection with a social event opportunity service. For example, a user may indicate his or her interest in one or more event opportunity types. For instance, a user may indicate an interest in tennis events, whether to participate or watch. This information may then be stored in the user profile. Thus, in one embodiment this information may be stored in a database accessible to the method (e.g., DB 115 in FIG. 1, or in a HSS/HLR along with information already in a conventional user profile). In one embodiment, the user may provide user preferences/information with respect to preferred event opportunity types through various means such as a web portal, one or more interactive web pages or one or more other applications through various drop down menus, dialog boxes, and the like.

At step 220, the method 200 registers preferred safety criteria, or safety parameters for the user. For example, user defined safety criteria may be registered in a user profile along with one or more event opportunity types of interest to the user. In particular, in one embodiment a user may define one or more safety parameters that other participants must satisfy in order for the user to be willing to engage in social event opportunities with the other participants. In one embodiment, the one or more safety parameters are broadly applicable to all potential social event opportunities in which the user may be a candidate for participation. As an example, a user may be a female interested in tennis or golf opportunities and is willing to be matched with other participants (e.g., unknown strangers) of any sex. However, the user may believe that it is safer to only be matched with users who have a certain education level. Thus, the user may, for instance, set "college graduate" as a safety parameter that other potential participants must satisfy in order to be matched with the user for a social event opportunity. Other examples include: restricting potential participants with whom the user may be matched to residents of particular towns, zip codes, geographic areas, certain professions, certain income levels, particular age ranges, and the like.

Notably, the user defined safety criteria do not necessarily pertain to how safe the other participants may be with respect to any specific event. For example, if a user is looking for opportunities to kayak with a partner, the user may seek other participants that have a particular type of equipment (e.g., an open hull ocean kayak for ocean kayaking) or a particular skill level (e.g., an expert kayaker with experience on class 5 rapids). While these may be considered factors with respect to the safety of a specific type of event (kayaking), these are not broadly applicable to other event opportunity types. In contrast, the user defined safety criteria registered at step 220 are broadly applicable to all potential social event opportunities. Thus, for example, whether the user is being matched for a tennis opportunity, a golf opportunity, or a kayaking opportunity, the other potential participants should match the user defined safety criteria (e.g., a college graduate) in order for the user to be matched to the other participants and to the event opportunity.

At step 230, the method 200 monitors or obtains additional user data. For instance, at steps 210 and 220, the method 200 may register one or more event opportunity types and one or more safety parameters for a user. However, in order to correlate different users with each other and with various event opportunities, the method 200 may rely upon various other points of information. For example, the method 200 may obtain calendar/scheduling information for a user. The calendar information may be stored in a network-based database, e.g., as part of a service provided by a network provider to its subscribers. The calendar information may also be maintained on a user device and shared with the method 200 as authorized by a user.

At step 230, the method 200 may also obtain location information of a user. For example, the method 200 may obtain general location information on a user from a HSS/HLR, a visiting location register (VLR), and the like. The information may be derived from records that pertain to a current serving base station (e.g., in the case that a user interfaces with the network via a cellular device), GPS information, or information manually provided by the user. For example, an application may be provided for use on a user device that automatically forwards location information via a network (e.g., network 100 in FIG. 1).

As an alternative, or in addition, the method 200 may obtain information from a presence server that monitors a user's "presence" on one or more devices or one or more services, at one or more locations. For example, although a user may be using a mobile device, the user may be logged into an office network and the presence server may be aware of this information. The method 200 may obtain the information from the presence server and determine that since the user is working, the user is not currently available for social event opportunities. However, when the user lots out, the presence server may update the user's presence information and notify the method 200. Thus, the method 200 may then begin to consider the user for immediately available potential event opportunities.

In addition to the specific information registered at steps 210 and 220, the method 200 may also maintain additional information, voluntarily provided, in the user profile of a user. For example, a user may choose to provide equipment information (e.g., means for transporting people and gear to a location to engage in an event opportunity, such as a trailer to haul at least two kayaks, a roof rack to carry at least two mountain bikes, etc.) with respect to one or more of the preferred event opportunity types, income information, employment information, and the like, for use by the method 200 in determining and arranging event opportunities for the user. Similarly, a user may be interested in participating in tennis and golf matches, but the user may have an intermediate skill level in golf, whereas the user is an expert in tennis. Thus, the method 200 may also receive skill level information of a user with respect to one or more preferred event opportunity types. Accordingly, additional information of this nature may be included along with event opportunity types registered in the user profile at step 210.

In addition, in one embodiment, the method 200 may maintain feedback/rating information with respect to a particular user along with the voluntary information in the user profile. For instance, other participants may be given the opportunity to provide feedback with respect to their experiences with other users in past social event opportunities. In some cases, the feedback/rating information obtained from other participants includes information as to the accuracy of the voluntary/self-reported information provided in the user profile. For example, if a user indicates he or she is an expert golfer, but that is not actually the case, other participants with whom the user has been matched for past golfing event opportunities may give feedback that the user is actually an intermediate golfer. Thus, various additional information may be obtained by the method at 230.

At step 240, the method 200 determines if there is an event opportunity that is available for a plurality of users, e.g., events that can be shared by at least two users, e.g., an available tennis court, an available golf time slot for two or more golfers. The method 200 may obtain information relating to various available event opportunities in several ways. For instance, in one embodiment the method 200 may provide an interface for third-parties/vendors to upload various event opportunities. This may comprise accepting various event opportunities from third-parties/vendors (e.g., retailers and the like), and including such opportunities in a list or database of available event opportunities. For instance, a tennis club may have a cancellation on a reservation for a particular tennis court at a particular time. In addition, the club would like to find alternative customers to fill the reservation. Accordingly, at step 240, the method 200 may receive a notice of an event opportunity from the tennis club. The notice of the event opportunity may be received in a standard format, e.g., an XML document with several predefined fields such as, an event type description, a time period, a cost, a number of participants, and the like. In one embodiment, the method 200 may be implemented by a network service provider as a service to such third parties. Alternatively, or in addition, such third-parties/vendors may subsidize an event opportunity service for general users (e.g., subscribers of the network service provider), according to the method 200.

As an alternative, or in addition, at step 240 the method 200 may receive notification of an event opportunity that is created by a user/participant. For example, a user may have a reservation for a tennis court at a particular time, but the user's partner has canceled or otherwise become unavailable. Accordingly, the method 200 may, at step 240, receive a notification of an event opportunity from this particular user. The notification may include an event type description (e.g., tennis match), a preferred skill level, a time, a location and the like. Similarly, a user may wish to go kayaking, but does not want to do so alone. Thus, the user may generate an event opportunity notification to the system that include information on the event such as date, time, required equipment, equipment that will be provided, preferred skill level and the like.

At step 250, the method 200 matches the user and at least one other potential participant to the event opportunity that is available. In other words, the method 200 matches at least two users/participants to each other and to the event opportunity. In one embodiment, the users that are matched at step 250 are unassociated with one another (e.g., strangers). For example, the users are not on each others' buddy lists or telephone contact lists, have had no prior direct communications, etc. In one embodiment, the method 200 obtains information from user profiles to determine that the users are unassociated. For instance, a user may explicitly define a buddy list in his or her user profile. In one embodiment, the method 200 may also obtain relevant information from various other places (e.g., one or more servers of a communication network that store call records, and the like).

As an example, in the case of a tennis club with an open reservation for a tennis court, the method 200 may search a database of user profiles for any matches to the event opportunity type. The matching may involve any number of algorithms for selecting a user profile as a match for an event opportunity. For instance, as a threshold, the method may restrict the search to users who are within a particular proximity to a location of the event opportunity (e.g., two miles, five miles, etc.). In addition, the method 200 may screen out any users whose calendar/scheduling information and/or presence information indicates that the user is busy or unavailable. The method may then match users to the event opportunity based upon interested event opportunity types of interest listed in each of the user's profiles. For example, the method may extract only those profiles that include "tennis matches" as an opportunity event type.

Thus, at step 250, the method 200 determines at least two users whose profiles match an event opportunity. However, aside from interest alone, the method 200 will further determine whether the users are a good match for each other based on other criteria. For example, embodiments of the present disclosure are directed to matching users who are strangers with one another to event opportunities. Thus, the method 200 may further filter any potential matches between users who are not associated with one another (e.g., users who have had prior communications, as determined by the method 200 from one or more points of information). In addition, the method 200 may only match users who have the same skill level, or are within a particular skill level range of one another. For instance, in one embodiment, the method 200 will not match an expert tennis player with a novice tennis player.

In one embodiment, the method 200 may match participants to event opportunities that are not explicitly defined in the event opportunity types of interest in the participant's user profile. For example, if an event opportunity type of "kayaking" is in a participant's user profile, the method 200 may sometimes match the user to event opportunities for stand-up paddling (a similar activity). In addition, although some embodiments may involve filling available event opportunities in advance, the present disclosure is not so limited. For instance, the method 200 may not be aware that two users with similar profiles will be near each other and available at the same time until such circumstances are actually occurring. Nevertheless, the method 200 may determine that immediately available event opportunities exist to which it can send invitations to the users. Thus, embodiments of the present disclosure can identify and create social event opportunities that would not otherwise take place, and to which participants might never become aware that they had missed.

In one embodiment, the method 200 matches more than two users with one another for an event opportunity. For example, a golfing event opportunity may be available that requires a foursome. Thus, at step 250, the method 200 may match four users to one another and to the event opportunity. Similarly, an ad-hoc basketball game may require four users (two on two), ten users (five on five), and the like.

It should be noted that not all event opportunities must be explicitly defined. For instance, as described above, the method may receive explicit event opportunity notices from third-parties/vendors (e.g., retailers, merchants, service providers, and the like) or from users/participants themselves. However, not all event opportunity types require advance scheduling. For example, some users'/participants' profiles may include a language practice event opportunity type. One user who is a native speaker of English may be interested in learning Spanish, while a second user may be a native speaker of Spanish and be interested in learning English from a native English speaker. Accordingly, at step 250, the method 200 may match such users based upon only the users' current statuses (e.g., not working, currently available), current locations and the similarity of the event opportunity types found in the respective user profiles.

It should also be noted that in some cases, there may be many potential participants that meet the criteria for the particular event opportunity. Thus, in one embodiment, the method 200 may use a "willingness to participate" score in order to further differentiate between potential participants. For example, if a user has turned down many event opportunity invitations in the past, the user's score may decline. On the other hand, a user who accepts social event opportunity invitations to a greater extent will have a greater score, and thus, will be selected at step 250 with a greater likelihood. Accordingly, in one embodiment, a user may provide explicit indications to the method 200 that the user, although technically available, is not interested in participating in current social event opportunities. Thus, the user may temporarily opt out of the service while keeping his or her score from declining. In any case, if the method 200 matches at least two users to an opportunity event and to each other at step 250, the method proceeds to step 260.

At step 260, the method 200 verifies the matched users are within the preferred safety criteria, as defined by the other user(s). In particular, the method 200 may register preferred safety criteria for one or more users, as defined by the users themselves, at step 220. At step 260, the method 200 verifies whether each of the users matched at step 250 satisfies the safety criteria of the other user(s). For example, a user may include in his or her preferred safety criteria one or more safety parameters, such as: "college graduate" and "income over $50,000 per year." The particular user may believe that employed college graduates earning greater than this amount of income per year are not likely to steal from or take advantage of the user. Notably, these safety parameters are user-defined, i.e., not defined by the system for all of the users. Thus, the method 200 is neutral with respect to user-defined safety criteria/safety parameters. Whether the safety parameters are, useful, correct, or even have any basis in fact is not explored, but is left to the discretion of the user.

If each of the users matches/satisfies the other participant(s) safety criteria, then the method 200 proceeds to step 270. However, in one embodiment, one or more of the users matched at step 250 will not meet the safety criteria of another participant as found at step 260. In this case, the method 200 proceeds back to step 250, where the method 200 attempts to match additional users to the opportunity event. However, in one embodiment, the method 200 may proceed to step 262 to request that a user relax one or more safety parameters. For example, in one embodiment, a user may have a safety parameter that states "income over $50,000 per year." In addition, there may be an event opportunity for a singles tennis match at a very attractive discounted price. However, there may be a limited pool of available candidate participants (e.g., because the event opportunity is in a sparsely populated area, is during work hours, so few participants are available, etc.). Thus, if there is a potential participant nearby and who is free, but earns $49,000 per year (e.g., as indicated in his or her voluntary user profile), the method 200 may prompt the user maintaining the safety parameter whether it is acceptable to relax this particular parameter. Based upon the attractiveness of the event opportunity and the fact that the other participant is very close to the threshold defined in the safety parameter, the user may be willing to relax the safety criteria.

The method 200 may contact the user through various means, such as an email, a text message to a mobile device, or through an automated call by a natural language interaction engine. In addition, the user may provide a response through various means, such as by entering data on a form provided in the email, through predefined text commands, via natural language response, and similar means. In any case, if the method 200 determines that the user is willing to relax the safety parameter at step 262, the method returns to step 260 where the method determines the safety criteria is satisfied. As such, the method 200 then proceeds to step 270.

It should also be noted that in one embodiment, step 262 may include prompting the participant who did not meet the safety criteria whether it is acceptable to reveal certain information in the participant's user profile. For instance, a participant who does not meet a safety criteria pertaining to a predefined income may not wish for his or her income to be revealed to another user. As such, the participant may decline to share this information, in which case, the method simply returns to step 260, and then back to step 250, to match additional users to the event opportunity.

In another embodiment, the method 200 may have insufficient information to determine at step 260 whether a potential participant meets a user's safety criteria. For instance, a user-defined safety parameter may require that a matching participant "never have been employed as a lawyer." For example, the user may have a general distrust of lawyers and does not want to be matched with lawyers. Another participant's user profile may indicate a current job title of "engineer." However, this does not reveal any information as to the user's past employment. Thus, in one embodiment, the method 200 may proceed to step 264 where the method requests additional information from the potential participant. For example, the method 200 may contact a potential participant at one or more endpoint devices that are used by the participant (e.g., a cellular telephone, a smart phone, and the like), prompting the participant to provide additional information in order for the method to evaluate the event opportunity. The method 200 may provide some information with respect to the general nature of the event opportunity in order for the potential participant to consider whether or not he or she is willing to provide the additional requested information. In some cases, the method 200 may simply provide a "yes" or "no" question to determine whether the potential participant satisfies the safety parameter. In any case, if at step 264, the method 200 receives a satisfactory response from the potential participant, the method proceeds back to step 260 where the method determines that the safety criteria have been satisfied.

At step 270, the method 200 has matched at least two users to each other and to an event opportunity. In addition, each of the users satisfies the other(s) various safety criteria. Thus, at step 270, the method 200 sends an invitation to each of the matched users, inviting each of the users to participate in the event opportunity. Along with the invitation, the method 200 may provide various pieces of information. For example, the invitation may indicate the general nature of the event opportunity (e.g., a tennis match at XYZ Tennis Club, 111 Main Street, Anytown, USA 88888, 7:00-8:00 pm today, doubles tennis match, two-person ocean kayaking at Big Wave Bay anytime after 4:00 pm today, round of golf at Exclusive Golf Club, tee time 10:00 am, cost $25, golf cart included, etc.). Similarly, in one embodiment, the method 200 may provide feedback/ranking information with respect to the event opportunity itself. For instance, the event opportunity may be an available time slot at a local tennis club. In addition, this may be a recurring event opportunity that arises on a frequent basis. Accordingly, in one embodiment, the method 200 may provide information that it has with respect to feedback and/or ratings pertaining to the event opportunity and/or the provider of such event opportunity. In addition, the invitation may include anonymous information pertaining to one or more of the other potential participants (e.g., 40 year old male, upper-intermediate tennis player, 45 year old female, intermediate kayaker with a two-person ocean kayak, 67 year old male, golf handicap of 92 and so on).

In some cases, the anonymous information may also include ranking/feedback information, or a feedback score, with respect to other potential participants. For example, as described in further detail below in connection with step 292, the method 200 may collect and maintain feedback information with respect to participating users. The information may be included in a score, and or general text information describing a user. For example, the method 200 may provide snippets of the four most recent feedback comments with respect to a particular user, based upon the user's past participation in event opportunities. The method 200 may also provide one or more scores (e.g., one to five stars, zero to ten ranking, etc.) with respect to various parameters such as punctuality, skill level (useful for insight beyond a skill level that may be self-reported by the user), trustworthiness, friendliness, and the like). In one embodiment, the method 200 may also provide an indication to a user that another user/participant satisfied a safety parameter through a request for additional credentials at step 264. For example, a user may be wary of accepting event opportunity invitations when another potential participant has only provided satisfactory information when prompted (e.g., through a question that may be suggestive of the correct answer).

At step 280, the method 200 determines whether the invitation is accepted by each of the invited users. For example, a particular event opportunity may require at least two participants (e.g., a tennis match). If one of two users who is invited to participate in the available event opportunity declines, then the method 200 has not filled the event opportunity. As such, the method 200 proceeds back to step 250 where the method again attempts to match at least two users (who are strangers) to the event opportunity and to each other. In some cases, the method 200 may simply search for one additional user to match a prior user who has already accepted the invitation. If an additional user is found at step 250, and also satisfies the safety criteria of the prior user, the method may simply send an invitation to this additional user. The prior user may not ever be aware that an additional user was found as a replacement. However, in some cases, there may not be any other users that can be matched to the prior user who has already accepted (e.g., due to a discrepancy in skill levels, not satisfying safety criteria, etc.). In such case, the method 200 may, having returned to step 250, find a completely new set of users that are potential matches. In addition, as mentioned above, in one embodiment, the method 200 may take note of each time a user declines an invitation to participate in an event opportunity. This may affect a "willingness to participate" score of the user. As such, at step 250, the method 200 is more likely to find users with a greater likelihood of accepting an offered event opportunity.

In any case, if at step 280 the method 200 has the requisite number of matched users who have accepted invitations (e.g., at least two), the method then proceeds to step 290 where the users are provided contact information for connecting with one another. For example, the method 200 may assign virtual telephone numbers to each of the users to use in contacting one another. The method 200 may map the virtual telephone numbers to the actual telephone numbers, session initiation protocol (SIP) addresses, and the like, associated with user devices of each of the users, thereby providing an anonymous yet convenient means for the users to contact one another prior to and/or during the event opportunity. In one embodiment, the method 200 may make the virtual telephone numbers available as long as necessary for the event opportunity, (e.g., until one hour after the scheduled end of the event, 24 hours after the start of the event, at the end of the calendar day, etc.). In one embodiment, the method 200 may provide a short messaging service (SMS) short code for a user to send messages to one or more of the other users. For example, a user may send a message to all of the other participants via a SMS message to the short code, without having to contact each of the other participants individually. This may be advantageous in instance such as a five on five basketball game, where it may be impractical for a user to contact each of the other nine participants individually.

At step 292, the method 200 receives user feedback. For example, after the end of the event (or even during the event), the method 200 may receive user feedback and ranking information with respect to the event itself and/or with respect to one or more of the other participants. In one embodiment, the method 200 may receive general text information describing a user and/or the event. The method 200 may then use this information in future event opportunity scenarios to provide recent feedback comments with respect to a particular user or with respect to the same event (e.g., event opportunities at a particular tennis club may have a frequent recurrence). The method 200 may also receive one or more feedback scores for one or more of the participants (e.g., one to five stars, zero to ten ranking, etc.) with respect to various parameters such as punctuality, skill level, trustworthiness, friendliness, and the like. Advantageously, by maintaining feedback information and/or feedback scores, the method 200 provides reinforcement for participating users and third-parties providing event opportunities to engage in desirable behaviors.

At step 295, the method terminates.

Figure 3:
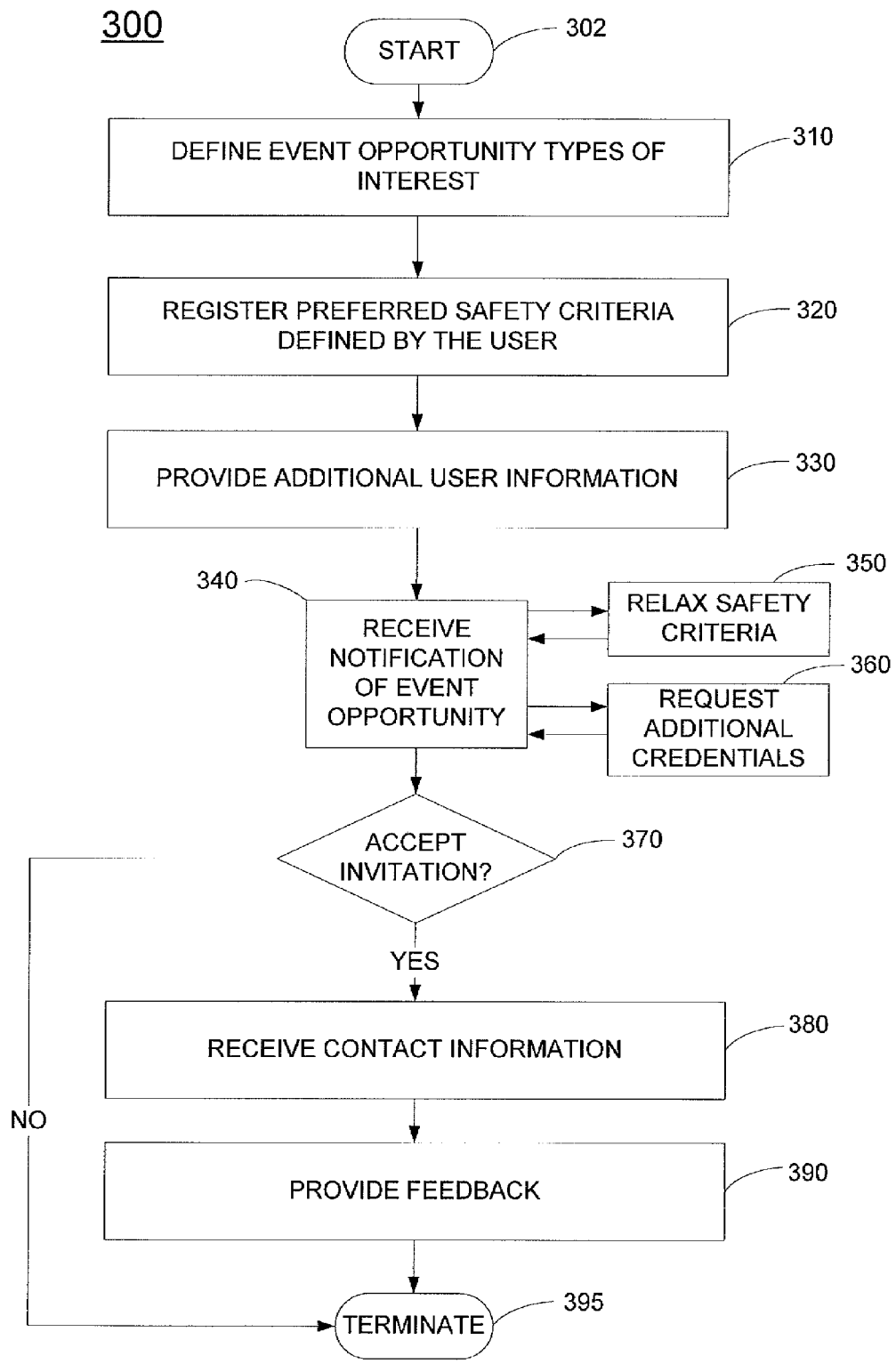
FIG. 3 illustrates a flowchart of another method for arranging social event opportunities, according to embodiments of the present disclosure.

FIG. 3 illustrates a flowchart of another method 300 for arranging social event opportunities. In various embodiments, the steps of the method 300 may be performed by any one or more of the components of the network 100 depicted in FIG. 1, including any one or more of the endpoint devices 102-107. Similarly, it should also be understood that one or more steps of the method 300 may be implemented by a general purpose computer having a processor, a memory and input/output devices as illustrated below in FIG. 4.

The method 300 begins in step 302 and proceeds to step 310. At step 310, the method 300 defines event opportunity types of interest to a user. For example, in accordance with the description above in connection with step 210 of the method 200, the method 300 may create/or define preferred event opportunity types of interest to a user. In one embodiment, step 310 includes providing such information to an event opportunity service (e.g., a network-based application server hosting such an event opportunity service). In one embodiment, the preferred opportunity event types defined at step 310 may be stored in a user profile by the event opportunity service.

At step 320, the method 300 registers preferred safety criteria defined by the user. For example, in accordance with the description above in connection with step 220 of the method 200, step 320 may include accepting user-defined safety criteria containing one or more user-defined safety parameters. In addition, in one embodiment step 320 further includes registering the user-defined safety criteria (e.g., with an event opportunity service, which may store the safety criteria in the user profile).

At step 330, the method 300 provides additional user information. For example, as described above in connection with step 230 of the method 200, in one embodiment a user may choose to provide additional user information, such as, skill level information, equipment information, income information, employment information, and the like, to be stored in a user profile for use in arranging event opportunities for the user. Accordingly, the method 300 may, at step 330, accept such additional information from a user and provide such information (e.g., to a social event opportunity service). Following step 330, the method 300 then proceeds to step 340.

At step 340, the method 300 receives a notification of an event opportunity. For example, an event opportunity service may match the user to an available event opportunity, and to one or more other unassociated users based upon at least one of the event opportunity types of interest defined at step 310. Accordingly, at step 340 the method 300 receives a notification of such an event opportunity that matches the user's interest. In one embodiment, the method 300 may display the notification of the event opportunity on a display of a user device (e.g., an IPTV, personal computer, a smart phone, a computing tablet, PDA and the like).

In one embodiment, the method 300 proceeds to step 350 where the method prompts a user to relax one or more safety parameters. For example, as described above in connection with steps 260 and 262 of the method 200, an available event opportunity may exist. However, there may be one or more other potential participants that do not satisfy the user's safety criteria (e.g., as defined as step 320). Accordingly, the user may still wish to be given a choice to waive or relax one or more safety parameters on a case by case basis. Thus, in one embodiment, the method 300 may receive a notification of a potential event opportunity at step 340, but may also receive an indication that there is not an exact match for one or more of the other potential participants with respect to the user's safety criteria. As such, at step 350 the method 300 may present to the user a choice to relax one or more of the safety parameters. In one embodiment, the method 300 may display the request on a display of a user device (e.g., an IPTV, personal computer, a smart phone, a computing tablet, PDA and the like) along with instructions for a user to provide a response.

In one embodiment, the method 300 may also proceed to step 360, where the method 300 requests additional information from the user. For example, as described above in connection with steps 260 and 264 of the method 200, in some cases there is insufficient information to determine whether a user meets the safety criteria of another potential participant of a social event opportunity. Thus, in accordance with the descriptions above of step 264 of the method 200, the method 300 may request additional information from the user. For instance, the method 300 may display the request on a display of a user device (e.g., an IPTV, personal computer, a smart phone, a computing tablet, PDA and the like) along with instructions for a user to provide a response.

Following either or both of steps 350 and 360, the method 300 returns to step 340. Assuming that the user satisfies the safety criteria of all other potential participants and that the other potential participants either satisfy the user's safety criteria registered at step 320, or have had one or more safety criteria waived, the method 300 may, at step 340, further receive a formal invitation to participate in the event opportunity. In one embodiment, in accordance with the descriptions of step 270 of the method 200 above, the invitation may include general information with respect to the event opportunity itself (e.g., date, time location, cost, number of required participants, rating/feedback information, etc.) and/or general anonymous information with respect to other invitees (e.g., age, sex, skill level, rating/feedback information, etc.). Thus, the method 300 may display the invitation to participate in the event opportunity, along with any other information that is received, on a display of a user device, along with instructions on how to accept or decline the invitation.

Following step 340, the method 300 proceeds to step 370 where the method determines whether the invitation is accepted. As described above, the invitation may be displayed by the method 300 along with other relevant information that may assist a user in deciding whether or not to accept the invitation. If the user declines the invitation, the method 300 proceeds to step 395 where the method terminates. However, if the user accepts the invitation, then the method 300 proceeds to step 380.

At step 380, assuming that all of the other invited users have accepted the invitation, the method 300 receives contact information for one or more of the other users/participants. For example, in accordance with the descriptions of step 290 of the method 200 above, the method 300 may receive one or more virtual phone numbers, SMS codes, and the like for use in contacting one or more other participants in the event opportunity. Following step 380, the method 300 then proceeds to step 390.

At step 390, assuming that the event opportunity is taking place or has concluded, the method 300 provides user feedback back to the service provider. The user feedback may include comments or rankings with respect to one or more of the participants, the event opportunity itself, or a third-party providing the event opportunity. For example, the method 300 may provide an interface that permits a user to provide feedback/ranking information (e.g., in accordance with the descriptions of step 292 of the method 200 above).

Following step 390, the method 300 proceeds to step 395 where the method terminates.

It should be noted that although not specifically specified, one or more steps of each of the respective methods 200 and 300 may include a storing, displaying and/or outputting step as required for a particular application. In other words, any data, records, fields, and/or intermediate results discussed in each of the respective methods can be stored, displayed and/or outputted to another device as required for a particular application. Furthermore, steps or blocks in each of FIGS. 2-3 that recite a determining operation or involve a decision do not necessarily require that both branches of the determining operation be practiced. In other words, one of the branches of the determining operation can be deemed as an optional step.

Figure 4:
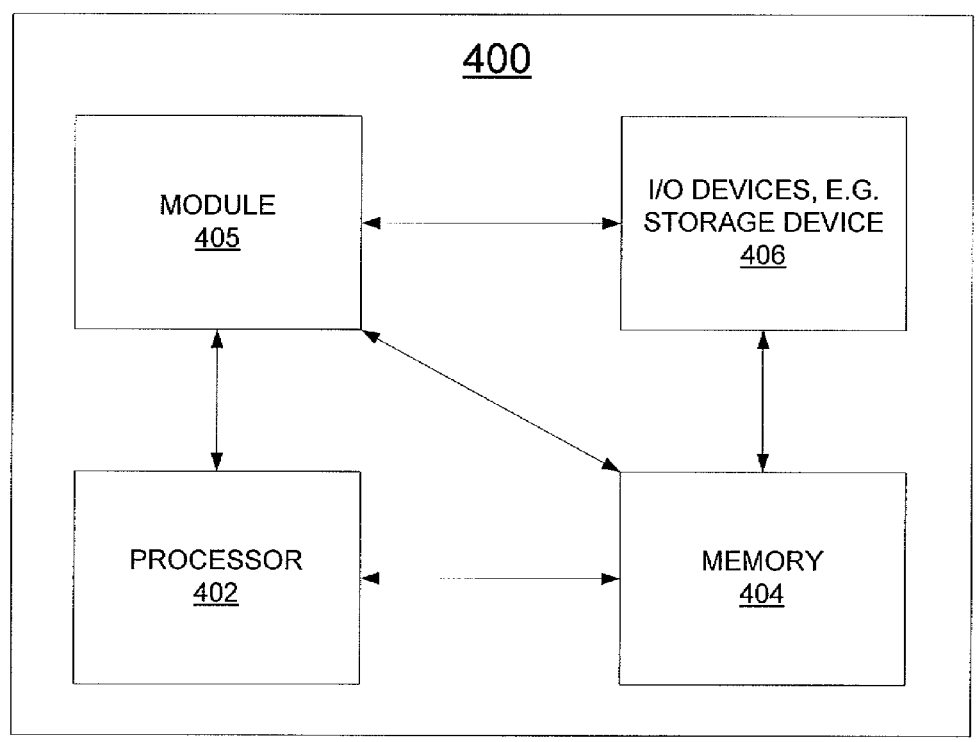
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for performing various functions as described herein, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, module 405 may comprise computer/processor executable code containing a plurality of instructions for performing steps of the exemplary methods 200 and/or 300.

Accordingly, it should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, in one embodiment, the module or process 405 can be loaded into memory 404 and executed by processor 402 to implement the functions as discussed above in connection with any one or more of the exemplary methods 200 and 300. As such, the present module or process 405 (including associated data structures) of the present disclosure can be stored on a non-transitory computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for arranging an event opportunity, the method comprising:
   detecting, by a processor deployed in a communication network, the event opportunity that matches user profiles of at least two users who are unassociated with one another, wherein the event opportunity is provided by a third-party that is different from the at least two users;
   verifying, by the processor, a safety parameter for one of the at least two users, wherein the safety parameter is defined by the one of the at least two users and comprises a criterion which the one of the at least two users desires a second of the at least two users to satisfy in order for the one of the at least two users to be willing to engage in the event opportunity with the second of the at least two users, wherein the verifying the safety parameter comprises:
      determining whether the second of the at least two users satisfies the safety parameter; and
      when the second of the at least two users does not satisfy the safety parameter, prompting the one of the at least two users to relax the safety parameter;
   when the safety parameter is satisfied, sending, by the processor, an invitation to the event opportunity to each of the at least two users; and
   providing, by the processor, contact information for the at least two users to contact each other, when each of the at least two users accepts the invitation.

2. The method of claim 1, wherein the contact information for the at least two users to contact each other maintains an anonymity of each of the at least two users.

3. The method of claim 1, further comprising:
   registering a user profile of the user profiles for each of the at least two users, wherein the user profile includes a preferred event opportunity type.

4. The method of claim 3, further comprising:
   registering the safety parameter in the user profile of the one of the at least two users, wherein the safety parameter is defined with respect to all event opportunities.

5. The method of claim 1, wherein the verifying safety parameter further comprises:
   attempting to determining whether the second of the at least two users satisfies the safety parameter; and
   when there is insufficient information to determine whether the second of the at least two users satisfies the safety parameter, prompting the second of the at least two users to provide additional information.

6. The method of claim 1, further comprising:
   monitoring location information with respect to each of the at least two users.

7. The method of claim 1, further comprising:
   monitoring calendar information with respect to each of the at least two users.

8. A non-transitory computer-readable medium storing instructions which, when executed by a processor deployed in a communication network, cause the processor to perform operations for arranging an event opportunity, the operations comprising:
   detecting the event opportunity that matches user profiles of at least two users who are unassociated with one another, wherein the event opportunity is provided by a third-party that is different from the at least two users;
   verifying a safety parameter for one of the at least two users, wherein the safety parameter is defined by the one of the at least two users and comprises a criterion which the one of the at least two users desires a second of the at least two users to satisfy in order for the one of the at least two users to be willing to engage in the event opportunity with the second of the at least two users, wherein the verifying the safety parameter comprises:
      determining whether the second of the at least two users satisfies the safety parameter; and
      when the second of the at least two users does not satisfy the safety parameter, prompting the one of the at least two users to relax the safety parameter;
   when the safety parameter is satisfied, sending an invitation to the event opportunity to each of the at least two users; and
   providing contact information for the at least two users to contact each other, when each of the at least two users accepts the invitation.

9. The non-transitory computer-readable medium of claim 8, wherein the contact information for the at least two users to contact each other maintains an anonymity of each of the at least two users.

10. The non-transitory computer-readable medium of claim 8, further comprising:
    registering a user profile of the user profiles for each of the at least two users, wherein the user profile includes a preferred event opportunity type.

11. The non-transitory computer-readable medium of claim 10, further comprising:
    registering the safety parameter in the user profile of the one of the at least two users, wherein the safety parameter is defined with respect to all event opportunities.

12. The non-transitory computer-readable medium of claim 8, wherein the verifying the safety parameter further comprises:
    attempting to determining whether the second of the at least two users satisfies the safety parameter; and
    when there is insufficient information to determine whether the second of the at least two users satisfies the safety parameter, prompting the second of the at least two users to provide additional information.

13. The non-transitory computer-readable medium of claim 8, further comprising:
    monitoring location information with respect to each of the at least two users.

14. The non-transitory computer-readable medium of claim 8, further comprising:
    monitoring calendar information with respect to each of the at least two users.

15. A method for arranging an event opportunity, the method comprising:
    defining, via a processor deployed in a communication network, an event opportunity type that is of interest to a user;
    registering, via the processor, a safety parameter, wherein the safety parameter is defined by the user and comprises a criterion which the user desires a potential user to satisfy in order for the user to be willing to engage in the event opportunity with the potential user;
    receiving, via the processor, a request to relax the safety parameter with respect to the potential user when the safety parameter is not satisfied by the potential user;

receiving, via the processor, an invitation for the event opportunity that matches the event opportunity type that is of interest to the user, and the potential user in accordance with the safety parameter, wherein the event opportunity is provided by a third-party that is different from the user and the potential user, wherein the invitation is also sent to the potential user; and receiving, via the processor, contact information for communicating with the potential user, when the user and the potential user both accept the invitation.

* * * * *